2,992,973
DEHYDROGENATION OF STEROIDS BY AZOTOBACTER MICROORGANISMS

Jiro Terumichi, Kobe, Japan, assignor to Takeda Pharmaceutical Industries, Ltd., Osaka, Japan
No Drawing. Filed Aug. 10, 1959, Ser. No. 832,499
Claims priority, application Japan Aug. 12, 1958
6 Claims. (Cl. 195—51)

This invention relates to a new process for the preparation of oxidation (dehydrogenation) products of steroid.

Briefly stated, the process of the invention is based upon the action of a culture of a microorganism of the genus Azotomonas or of the genus Azotobacter on steroids which, according to the invention, produces oxidation (dehydrogenation) products of the steroids.

In a particular aspect of the invention, advantage is taken of this dehydrogenating (oxidizing action) for the preparation of $\Delta^1$-dehydrosteroids. By this embodiment of the invention, a steroid wherein the positions 1 and 2 are saturated with hydrogen and which, preferably, have an oxo group at the 3-position is dehydrogenated by the action of the enzyme system of a microorganism of the genus Azotomonas or of the genus Azotobacter, with formation of a double bond between the positions 1 and 2, thereby producing the corresponding $\Delta^1$-dehydrosteroid.

The starting steroids, generally speaking, are of the pregnane or androstane series, wherein the 1- and 2-position are saturated with hydrogen and the 3-position bears an oxo group. The starting steroids may also be substituted in positions other than the 1-, 2- and 3-positions of the steroid skeleton, and such substituents may for example be oxo, hydroxyl, halogen, carboxy or alkyl groups, etc. in any suitable combination and number. Hydroxy groups, if present, are preferably protected during the dehydrogenation according to the invention by conversion thereof into ether or ester groups, while oxo groups may be protected by conversion into the ketal, semicarbazone or hydrazone groups. Such protection is per se not part of the instant invention and may be effected in manner well known in the art.

It is unnecessary to take the steric configuration of these steroids into consideration, since they may belong to the so-called nor as well as the homo series.

Typical illustrative steroids which can be used as starting compounds in the process of the present invention are pregnane - 3,20-dione, $\Delta^{4,11}$-pregnadiene-3,20-dione, $\Delta^4$-pregene-3,20-dione, $\Delta^4$-pregnen-11 (or 12 or 14)-ol-3,20-dione, $\Delta^4$-pregnene-17$\alpha$,21-diol-3,20-dione, $\Delta^4$-pregnene-17$\alpha$,21-diol-3,11,20-trione, $\Delta^4$-pregnene-11$\beta$,21-diol-3,20-dione, $\Delta^4$-pregnen-21-ol-3,20-dione, $\Delta^4$-pregnene-11$\beta$,17$\alpha$,21-triol-3,20-dione, $\Delta^4$-pregnene-11$\beta$,16$\alpha$,17$\alpha$,21-tetrol-3,20-dione, 6(or/and) 9$\alpha$-(di)-fluoro-$\Delta^4$-pregnene-11$\beta$,17$\alpha$,21-triol-3,20-dione, 6-methyl-$\Delta^4$-pregnene-17$\alpha$,21-diol-3,11,20-trione, $\Delta^4$-pregnene-17$\alpha$,19,21-triol-3,20-dione, allopregnane-3,20-dione, androstane-3,17-dione, $\Delta^4$-androsten-17$\alpha$-ol-3-one, $\Delta^4$ (or $\Delta^5$)-androstene-3,17-dione, $\Delta^4$-androstene-3-11,17-trione, and their derivatives obtainable by converting their hydroxyl groups into ester, ether or halogenide groups, or converting their oxo groups into ketal, hydrazone or semicarbazone groups.

Of the microorganisms used in the present method, the preferred ones belonging to the genus Azotomonas are *Azotomonas insolita* Stapp and *Azotomonas fluorescens* Krassilnikov, while the preferred ones belonging to the genus Azotobacter are *Azotobacter chroococcum* Beijerinck, *Azotobacter agilis* Beijerinck, and *Azotobacter indicus* Starkey and De. Those names are all based on "Bergey's Manual of Determinative Bacteriology," 7th edition, published by the Williams and Wilkins Co., Baltimore, Md., U.S.A. (1957).

The afore-mentioned microorganisms are available from known sources such as "Northern Regional Research Laboratory, U.S. Department of Agriculture, Peoria, Ill., U.S.A."; "American Type Culture Collection, Washington, D.C., U.S.A."; "Centraalbureau voor Schimmelculture, Baarn," Holland; "Institute of Applied Microbiology, Tokyo University, Tokyo, Japan"; "Institute for Fermentation, Osaka, Osaka, Japan" and "Nagao Institute, Tokyo, Japan." Further, they can be obtained from natural sources using techniques known to microbiologists.

In carrying out the process of the invention, the steroid to be converted into the $\Delta^1$-dehydrosteroid form is subjected to the action of the oxidizing (dehydrogenating) enzyme system produced by incubating the microorganism with the starting steroid. Alternatively, the microorganism which is to provide the enzyme system is incubated alone in an appropriate medium and the cells, after being separated from the fermentation mixture, are further incubated in another nutrient medium which also contains the steroid to be dehydrogenated.

It is desirable that the nutrient medium for growing the microorganism contain a carbon source assimilable by the microorganism and a small quantity of necessary inorganic salts, but a nitrogen source is not always indispensable as long as the incubation is conducted under aeration.

Examples of suitable aqueous nutrient media for use according to this invention are the following (the percentages being by weight, and it being understood that in each case the remainder of the medium consists of distilled water, to make up 100%):

Composition 1

| | Percent |
|---|---|
| Urea | 0.2 |
| $KH_2PO_4$ | 0.03 |
| $MgSO_4$ | 0.02 |
| $FeSO_4$ | 0.001 |
| Glucose | 2.0 |

Composition 2

| | Percent |
|---|---|
| Cornsteep liquor | 0.2 |
| $KH_2PO_4$ | 0.01 |
| $MgSO_4$ | 0.05 |
| $FeSO_4$ | 0.001 |
| Ammonium succinate | 2.0 |

Composition 3

| | Percent |
|---|---|
| Mannitol | 1.5 |
| Asparagin | 0.05 |
| $CaCl_2$ | 0.1 |
| $K_2HPO_4$ | 0.1 |
| $KNO_3$ | 0.05 |
| $MgSO_4$ | 0.02 |
| NaCl | 0.01 |
| $FeCl_3$ | 0.0002 |

Composition 4

| | Percent |
|---|---|
| Mannitol | 1.5 |
| $CaCO_3$ | 0.5 |
| $K_2HPO_4$ | 0.02 |
| $MgSO_4$ | 0.02 |
| NaCl | 0.02 |
| $FeCl_3$ | A trace |

Composition 5

| | Percent |
|---|---|
| Mannitol | 1.5 |
| $K_2HPO_4$ | 0.02 |
| $MgSO_4$ | 0.02 |
| $CaCl_2$ | 0.002 |
| $FeCl_3$ | A trace |

Composition 6

| | Percent |
|---|---|
| Cornsteep liquor | 1.0 |
| Lactose | 1.0 |
| $(NH_4)_3PO_4$ | 0.05 |

Composition 7

| | Percent | | Percent |
|---|---|---|---|
| Glucose | 2.0 | $CaCl_2$ | 0.005 |
| $K_2HPO_4$ | 0.08 | $Na_2WO_4$ | 0.00005 |
| $KH_2PO_4$ | 0.02 | $Na_2MoO_4$ | 0.00005 |
| $MgSO_4 \cdot 7H_2O$ | 0.02 | $MnSO_4$ | 0.00005 |
| NaCl | 0.02 | $FeSO_4$ | 0.0025 |

It is evident from the foregoing that the specific character of the nutrient media may be varied widely without significantly affecting the steroid oxidizing or dehydrogenating character of the microorganism.

The incubation of the microorganisms may be conducted statically, but as the microorganisms employed are aerobic, it is advantageous for industrial purposes to conduct the incubation by submerged culture under aeration and with shaking or stirring.

It is preferred and advantageous to carry out the incubation at a pH of 5-8 at a temperature of 20-30° C. for a period of 24-100 hours, but these conditions are not inflexible. The pH of the medium, the incubation temperature, the incubation time and other conditions are subject to variation in order to obtain optimum results, in accordance with the particular starting steroid, mode of bringing the steroid into contact with enzyme system, concentration of the substrates, etc.

The concentration of the substrates may vary widely. A concentration of 0.5-5% by weight is generally preferable; however, it is a feature of the present invention that the concentration of the substrates may be as high as 40%. Addition of the substrates is conducted at the start or at an appropriate stage of the incubation; however, when separated cells are employed, the substrates may be added before the start of the incubation.

When the dehydrogenation is complete, the resultant $\Delta^1$-steroid may be recovered from the fermentation (culture) broth in any one of a wide variety of per se conventional ways. For example, the product can be adsorbed on an adsorbent such as active carbon and then extracted with a solvent such as methanol or ethanol, or it can be directly extracted with a water-immiscible solvent, such as chloroform, methylene chloride, ethylene chloride or acetic acid esters, or it can be separated by a countercurrent distribution method, using the above solvents. The $\Delta^1$-dehydrosteroids can also be separated by chromatography, using alumina, silica gel, cellulose or pulp as carrier, or by utilizing difference in solubility in various solvents, or by conversion into their functional derivatives with Girard reagent-T or -P or with a lower aliphatic acid anhydride and a deacidating agent and then recovering the original compounds from the products.

The products of the present invention, $\Delta^1$-dehydrosteroids, are useful, for example, as the medicines having activities of cortical hormones and/or sexual hormones, or as intermediates for producing such medicines.

The following examples set forth presently-preferred exemplary embodiments of the invention; they are intended to be solely illustrative, however, and not at all limitative of the invention. In the examples, parts by weight bear the same relationship to parts by volume as do grams to milliliters. "ATCC" refers to American Type Culture Collection, Washington, D.C., and "IAM" has reference to Institute of Applied Microbiology, Tokyo University, Tokyo, Japan.

EXAMPLE 1

In 500 parts by volume of nutrient medium (Composition 3, supra), which is first adjusted to pH 7.0 and is then sterilized, there is inoculated a strain of *Azotomonas fluorescens* Krassilnikov, and incubation is then carried out at 28° C. for 48 hours. At the end of this time, there is added a sterilized solution of 0.500 part by weight of $\Delta^4$-pregnene-11$\beta$,17$\alpha$,21-triol-3,20-dione in a small quantity of ethanol, whereupon the incubation is continued for an additional 48 hours under shaking. The culture broth is adjusted to pH 4.0 and extracted three times with 200 parts by volume-portions of ethyl acetate. The combined extracts are washed with aqueous sodium bicarbonate solution and water successively, after which the ethyl acetate is distilled off under reduced pressure, leaving 0.435 part by weight of a residue. This residue is purified by adsorption chromatography on alumina, using methanol as eluant, followed by recrystallization from acetone to give 0.350 part by weight of $\Delta^{1,4}$-pregnadiene-11$\beta$,17$\alpha$,21-triol-3,20-dione.

The strain of *Azotomonas fluorescens* employed in the present example is on deposit at ATCC under the accession number ATCC-13544.

EXAMPLE 2

In 500 parts by volume of nutrient medium (Composition 1, supra), which is first adjusted to pH 7.0 and is then sterilized, there is inoculated a strain of *Azotomonas fluorescens* Krassilnikov, and incubation is then carried out at 28° C. for 96 hours. At the end of this time, there is added a sterilized solution of 0.500 part by weight of $\Delta^4$-pregnene-17$\alpha$,21-diol-3,20-dione in a small quantity of ethanol, whereupon the incubation is continued for an additional 48 hours under shaking. The culture broth is adjusted to pH 4.0 and extracted three times with 200 parts by volume-portions of ethyl acetate. The combined extracts are washed with aqueous sodium bicarbonate solution and water successively, after which the ethyl acetate is distilled off under reduced pressure, leaving 0.360 part by weight of a residue. This residue is purified by adsorption chromatography on alumina, using methanol as eluant, followed by recrystallization from acetone to give 0.165 part by weight of $\Delta^{1,4}$-pregnadiene-17$\alpha$,21-diol-3,20-dione.

The strain of *Azotomonas fluorescens* employed in the present example is on deposit at ATCC under the accession number ATCC-13544.

EXAMPLE 3

In 500 parts by volume of nutrient medium (Composition 3, supra), which is first adjusted to pH 7.0 and is then sterilized, there is inoculated a strain of *Azotobacter indicus* Starkey and De, and incubation is then carried out at 28° C. for 96 hours. At the end of this time, there is added a sterilized solution of 0.500 part by weight of $\Delta^4$-pregnene-11$\beta$,17$\alpha$,21-triol-3,20-dione in a small quantity of ethanol, after which incubation is continued for an additional 96 hours under shaking. The culture broth is treated in the same way as in Example 1, yielding 0.435 part by weight of residue. The latter is purified by adsorption chromatography on alumina, using methanol as eluant, followed by recrystallization from acetone to give 0.210 part by weight of $\Delta^{1,4}$-pregnadiene-11$\beta$,17$\alpha$,21-triol-3,20-dione.

The strain of *Azotobacter indicus* used in the present example is on deposit at ATCC under the accession number ATCC-9037 through IAM.

The same result is obtained by using, instead of the strain ATCC-9037, a strain of *Azotobacter indicus* which is on deposit at ATCC under the accession number ATCC-9540 through IAM.

EXAMPLE 4

$\Delta^4$-pregnene-11$\beta$,17$\alpha$,21-triol-3,20-dione is converted to $\Delta^{1,4}$-pregnadiene-11$\beta$,17$\alpha$,21-triol-3,20-dione in the same way as in Example 3, using *Azotobacter agilis* Beijerinck instead of *Azotobacter indicus*.

The strain of *Azotobacter agilis* used in the present example is on deposit at ATCC under accession number ATCC-9042 through IAM.

EXAMPLE 5

In 500 parts by volume of nutrient medium (Composition 6, supra), which has been adjusted to pH 7.0 and sterilized, there is inoculated a strain of *Azotomonas fluorescens* Krassilnikov, and incubation is then carried out for 96 hours at 28° C. At the end of this time, there are added 20 parts by weight of $\Delta^4$-pregnene-11$\beta$,17$\alpha$,21-triol-3,20-dione in the form of fine powder, and the incubation is then continued for 96 more hours. As the oxidation product separates out in the culture broth, it is collected by filtration and purified by recrystallization from ethyl acetate. The filtrate is treated in the same manner as in Example 1 to give another crop of crystals. The total yield of $\Delta^{1,4}$-pregnadiene-11$\beta$,17$\alpha$,21-triol-3,20-dione is 14.4 parts by weight.

The strain of *Azotomonas fluorescens* used in the present example is the same as that used in Example 1.

$\Delta^4$-pregnene-3,20-dione, $\Delta^4$-pregnen-11$\beta$-ol-3,20-dione, $\Delta^4$-pregnen-21-ol-3,20-dione, $\Delta^4$-pregnene-11$\beta$,21-diol-3,20-dione, $\Delta^4$-pregnene-17$\alpha$,21-diol-3,11,20-trione, $\Delta^4$-pregnene-17$\alpha$,19,21-triol-3,20-dione, 9$\alpha$-fluoro-$\Delta^4$-pregnene-11$\beta$,17$\alpha$,21-triol-3,20-dione, 9$\alpha$-fluoro-$\Delta^4$-pregnene-11$\beta$,16$\alpha$,17$\alpha$,21-tetrol-3,20-dione, 17$\alpha$-methyl-$\Delta^4$-pregnen-21-ol-3,20-dione, $\Delta^{4,11}$-pregnadiene-3,20-dione, androstane-3,17-dione, $\Delta^4$-androsten-17$\beta$-ol-3-one, 17$\alpha$-methyl-$\Delta^4$-androsten-17$\beta$-ol-3-one or 17$\alpha$-ethynyl-$\Delta^4$-androsten-17$\beta$-ol-3-one, can be oxidized in a similar way to the above to produce $\Delta^{1,4}$-pregnadiene-3,20-dione, $\Delta^{1,4}$-pregnadien-11$\beta$-ol-3,20-dione, $\Delta^{1,4}$-pregnadien-21-ol-3,20-dione, $\Delta^{1,4}$-pregnadiene-11$\beta$,21-diol-3,20-dione, $\Delta^{1,4}$-pregnadiene-17$\alpha$,21-diol-3,11,20-trione, $\Delta^{1,4}$-pregnadiene-17$\alpha$,19,21-triol-3,20-dione, 9$\alpha$-fluoro-$\Delta^{1,4}$-pregnadiene-11$\beta$,17$\alpha$,21-triol-3,20-dione, 9$\alpha$-fluoro-$\Delta^{1,4}$-pregnadiene-11$\beta$,16$\alpha$,17$\alpha$,21-tetrol-3,20-dione, 17$\alpha$-methyl-$\Delta^{1,4}$-pregnadien-21-ol-3,20-dione, $\Delta^{1,4,11}$-pregnatriene-3,20-dione, androstane-3,17-dione, $\Delta^{1,4}$-androstadien-17$\beta$-ol-3-one, 17$\alpha$-methyl-$\Delta^{1,4}$-androstadien-17$\beta$-ol-3-one or 17$\alpha$-ethynyl-$\Delta^{1,4}$-androstadien-17$\beta$-ol-3-one, respectively.

Having thus disclosed the invention, what is claimed is:

1. A process for introducing a double bond between the positions 1 and 2 of a steroid wherein said positions are saturated, which comprises bringing the steroids into contact with an enzyme system produced by cultivation of a microorganism selected from the group consisting of *Azotomonas fluorescens*, *Azotobacter indicus* and *Azotobacter agilis*, thereby producing the corresponding $\Delta^1$-steroid.

2. A process as claimed in claim 1, wherein the starting steroid is $\Delta^4$-pregnene-17$\alpha$,21-diol-3,20-dione.

3. A process as claimed in claim 1, wherein the starting steroid is $\Delta^4$-pregnene-11$\beta$,17$\alpha$,21-triol-3,20-dione.

4. A process as claimed in claim 1, wherein the microorganism is *Azotomonas fluorescens*.

5. A process as claimed in claim 1, wherein the microorganism is *Azotobacter indicus*.

6. A process as claimed in claim 1, wherein the microorganism is *Azotobacter agilis*.

References Cited in the file of this patent
UNITED STATES PATENTS

| | | |
|---|---|---|
| 2,776,927 | Shull | Jan. 8, 1957 |
| 2,876,171 | Shull | Mar. 3, 1959 |

OTHER REFERENCES

Nature, vol. 160, page 639, November 8, 1947.